United States Patent [19]

Takeda et al.

[11] Patent Number: 4,715,145
[45] Date of Patent: Dec. 29, 1987

[54] LOCK-UP CONTROL FOR SHOCKLESS GEAR SHIFTING

[75] Inventors: Hitoshi Takeda; Sadao Takase, both of Yokohama, Japan

[73] Assignee: Nissan Motor Co., Ltd., Yokohama, Japan

[21] Appl. No.: 739,854

[22] Filed: May 31, 1985

[30] Foreign Application Priority Data

Jun. 1, 1984 [JP] Japan .................. 59-110676

[51] Int. Cl.⁴ ............................................. B60K 41/22
[52] U.S. Cl. ....................................... 74/731; 74/864; 74/866; 192/0.34; 192/3.29
[58] Field of Search .................. 74/731, 732, 733, 862, 74/866, 869, 864; 192/0.034, 0.032, 3.31, 3.28, 3.29

[56] References Cited

U.S. PATENT DOCUMENTS

| | | | |
|---|---|---|---|
| 3,293,934 | 12/1966 | Schaefer et al. | 74/864 |
| 3,602,069 | 8/1971 | Mori et al. | 74/731 X |
| 3,683,720 | 8/1972 | Wakamatsu et al. | 74/731 |
| 3,752,012 | 8/1973 | Ross et al. | 74/731 |
| 3,818,783 | 6/1974 | Norris et al. | 74/864 X |
| 4,051,931 | 10/1977 | Arai et al. | 74/733 X |
| 4,090,417 | 5/1978 | Burcz et al. | 74/864 |
| 4,105,100 | 8/1978 | Iijima | 192/0.034 |
| 4,220,058 | 9/1980 | Petzold | 74/866 X |
| 4,270,636 | 6/1981 | Sunohara et al. | 74/731 X |
| 4,431,095 | 2/1984 | Suga | 192/3.29 X |
| 4,457,410 | 7/1984 | Suga et al. | 74/731 X |
| 4,476,970 | 10/1984 | Ito | 192/3.29 X |
| 4,507,985 | 4/1985 | Morimoto et al. | 74/862 X |
| 4,539,869 | 9/1985 | Suga et al. | 74/731 X |

FOREIGN PATENT DOCUMENTS 170560 9/1984 Japan .................. 74/731

Primary Examiner—Leslie Braun
Assistant Examiner—Dwight G. Diehl
Attorney, Agent, or Firm—Schwartz, Jeffery, Schwaab, Mack, Blumenthal & Evans

[57] ABSTRACT

A lock-up control system for a lock-up type automatic transmission is disclosed where the transmission output torque is monitored and the interruption of the lock-up action is executed after the transmission output torque has satisfied a predetermined condition after generation of a command for shifting within the transmission.

6 Claims, 15 Drawing Figures

LOCK-UP CONTROL FOR SHOCKLESS GEAR SHIFTING

BACKGROUND OF THE INVENTION

The present invention relates generally to a lock-up type automatic transmission, and particularly to an improvement in a lock-up control whereby the occurrence of substantial shift shocks is prevented.

Commonly, automatic transmissions have a torque converter in order to multiply the torque from an engine. In the torque converter, an inlet element (a pump impeller) driven by the engine imparts a rotational force to a hydraulic fluid contained in the torque converter, and the rotation of the fluid causes an output element (a turbine runner) to rotate under the reaction of a stator, thus multiplying the engine torque (this mode of operation being called the "converter state"). Owing to this hydrodynamic transmission of power, the torque converter is subjected to a slip between the pump impeller and the turbine runner while it is in operation. Thus, automatic transmissions having a torque converter exhibit poor fuel economy due to poor power transmission efficiency although they are easy to operate. In order to alleviate this drawback, there has been proposed a torque converter with a so-called lock-up or bridge clutch (which may be called as a lock-up torque converter) wherein the turbine runner is directly and mechanically connected to the pump impeller (this mode of operation being called as "a lock-up state") in order to eliminate the slip at relatively high vehicle speed range where the engine is not subject to substantially torque variations. Recently, some automobiles have begun to use such an automatic transmission with a lock-up torque converter.

Referring to FIG. 7, a shift pattern diagram illustrates lock-up ranges of an automatic transmission wherein the torque converter with the lock-up clutch assumes the lock-up state when an actual vehicle speed is higher than a preset vehicle speed value (i.e., a lock-up vehicle speed) for each of forward speed or gears. In this Figure, there is illustrated a shift schedule for upshiftings to take place in a three-speed automatic transmission, where V1, V2 and V3 designate lock-up vehicle speeds for the first, second and third speeds, respectively, and A, B and C designate lock-up ranges for the first, second and third speeds, respectively. In the case of automatic transmission where the torque converter locks up when the vehicle speed is higher than the lock-up vehicle speed as mentioned above, a shifting between two adjacent forward speeds with the accelerator pedal depressed deeply by great degree (with a large throttle opening degree) takes place when the torque converter remains in the lock-up state thereof as will be readily understood from the fact that the lock-up ranges A, B and C are disposed one next to another along the vehicle speed at the large throttle opening degrees. If shifting were to take place with the torque converter in the lock-up state, substantially great shocks would take place because the torque variations upon shifting could not be absorbed.

In the lock-up type automatic transmission of this kind, the above mentioned problem has been partly solved although not completely by releasing the lock-up action upon shifting even during operation in any one of the above mentioned lock-up ranges, thereby temporarily causing the torque converter to operate in the torque converter state. It is therefore the common practice to provide a shift detecting circuit which generates a shift indicative signal for a predetermined period of time after a command for shifting has been made and the lock-up action is interrupted temporarily while the shift signal from this circuit is present even during operation in any one of the lock-up ranges.

Describing how the above mentioned shift detecting circuit works in shifting from the second speed to the third speed referring to FIG. 10A, it generates a shift signal for a predetermined period of time T' at the same instant t1 when a command for shifting takes place for releasing the lock-up (L/u) action. According to this control strategy, the lock-up action is released too early, thus posing problems as follows. There is a delay from the instant t1 when the command for shifting is made to the instant t3 when the actual shifting operation initiates, viz., initiation of actuation of the friction elements, because of a response delay in the hydraulic control system of the transmission. Therefore, if the lock-up action is released simultaneously with the instant t1 when the command for shifting is made, the lock-up action is released before the actual shifting operation begins, so that engine revolution speed rises rapidly during a moment from t1 to t2 as shown in FIG. 10A, causing the engine to race. Owing to the fact that releasing the lock-up action terminates so as to allow the lock-up action to resume during a moment from t3 to t4 when the shifting operation actually takes place, the torque converter cannot aborb shift shocks inherent with the shifting operation, and this fact is combined with the fact that engine revolution speed rises resulting from engine racing as mentioned, causing the magnitude of peak torque to occur at the instant t5 immediately after the shifting operation, with the inevitable result of substantial shift shocks. This tendency becomes marked when the automatic transmission is subject to an upshifting because the upshifting takes place with the power-on mode. This problem is more serious upon upshifting from the second speed to the third speed where a front clutch that is to be engaged for the third speed is engaged while releasing a second brake which is to be applied for the second speed because the completion of the actual shifting operation is delayed further due to a long overlap time in shifting.

As one measure to solve this problem, it is conceivable to elongate the lock-up interrupt time T' up to the instant when the shifting operation is to be completed, but this leaves the racing problem of the engine unsolved. The increase in the engine revolution speed causes the corresponding increase in the magnitude of shift shocks.

For solving the above mentioned problem, U.S. Pat. No. 4,431,095 issued to Massaki Suga on Feb. 14, 1984 has disclosed a lock-up type automatic transmission wherein a delay circuit is provided so as to delay generation of a shift signal for a predetermined time T1 after the instant t1 when the command for shifting is made as shown in FIG. 10B, whereby the interruption (OFF) of the lock-up (L/u) action, where is to take place upon shifting during operaion in any one of the lock-up ranges, begins at the instant t3 when the actual shifting operation begins.

However, the delay time from the instant t1 to the instant t3 (i.e., the delay from the instant when the command for shifting is made to the instant when the actual shifting operation initiates) varies from one manufacturing product to another due to manufacturing dispersion among products, i.e., a difference in flow resistance in shift control fluid passages and variation in viscosity of hydraulic fluid, and it has been confirmed that the predetermined time T1 set by the above mentioned delay circuit does not necessarily agree with the delay time from t1 to t3 with the result that with this conventional measure the above mentioned engine racing and substantial shift shocks cannot be prevented.

The period of time from t3 to t4 taken for actual shifting operation is subject to variation due to the manufacturing dispersion among products although the amount of such variation is not as large as the magnitude of variation experienced in the delay time from t1 to t3. Thus, it cannot be said that the lock-up interrupt time T' is always equal to the actual time from t3 to t4. Therefore, even if the predetermined time T1 agrees well with the delay time from t1 to t3, the lock-up interrupt releasing timing does not always agree with the termination of the actual shifting (the instant t4), thus failing to accomplish complete prevention of shift shocks.

Considering the variation in the transmission output torque during actual shift operation and before and after the duration, as shown in FIGS. 10A and 10B, the transmission output torque starts to drop at the instant t3 when the actual shift operation is initiated because a first friction element which has been engaged is released (i.e., a second brake in the case of 2–3 upshift). Thereafter, the transmission output torque increases again because of the engagement of a second friction element scheduled to be engaged subsequently (i.e., a front clutch in the case of 2–3 upshift) and continues to increase after the instant t4 when the engagement of the second friction element is completed because of the inertia of the engine. This increasing torque reaches a peak at the instant t5. After experiencing this peak, the torque decreases to a level which the transmission output torque should assume after the shift operation and reaches this level after the instant t6. In other words, the time derivative of the transmission output torque becomes very small after the instant t6.

The occurrence of shift shocks is brought about by the torque variation which begins with the instant when the transmission output torque exceeds an extending line of the torque variation trend occurring immediately before the instant t3 after the actual shifting operation has begun and which ends with the instant t6 when the transmission output torque reaches the certain level. Therefore, if the lock-up is interrupted during this period of time, the shift shocks are suppressed to a sufficiently low level.

Accordingly, an object of the present invention is to provide a lock-up control which causes a shockless gear shifting by precision control of a lock-up interruption timing and duration.

SUMMARY OF THE INVENTION

According to the present invention, there is provided a lock-up control for a lock-up type automatic transmission such that an output torque of the transmission is monitored and the interruption of the lock-up action of a torque converter is executed after the transmission output torque has satisfied a predetermined condition after generation of a command for gear shifting in the transmission.

More particularly, one aspect of the present invention is to provide a lock-up control system for a lock-up type automatic transmission including a torque converter with a lock-up clutch, comprising:
  means for detecting the occurrence of a command for shifting within the transmission and generating a shifting command signal;
  means for detecting an output torque of the transmission and generating a transmission output torque signal indicative of the output torque of the transmission; and
  means for interrupting the lock-up action of the torque converter by releasing the engagement of the lock-up clutch after said transmission output torque signal has satisfied a predetermined condition after generation of said shifting command signal.

Another aspect of the present invention is to provide a lock-up control method for a lock-up type automatic transmission including a torque converter with a lock-up clutch, comprising:
  detecting the occurrence of a command for shifting within the transmission and generating a shifting command signal;
  detecting an output torque of the transmission and generating a transmission output torque signal indicative of the output torque of the transmission; and
  interrupting the lock-up action of the torque converter by releasing the engagement of the lock-up clutch after said transmission output torque signal has satisfied a predetermined condition after generation of said shifting command signal.

Figure 1:
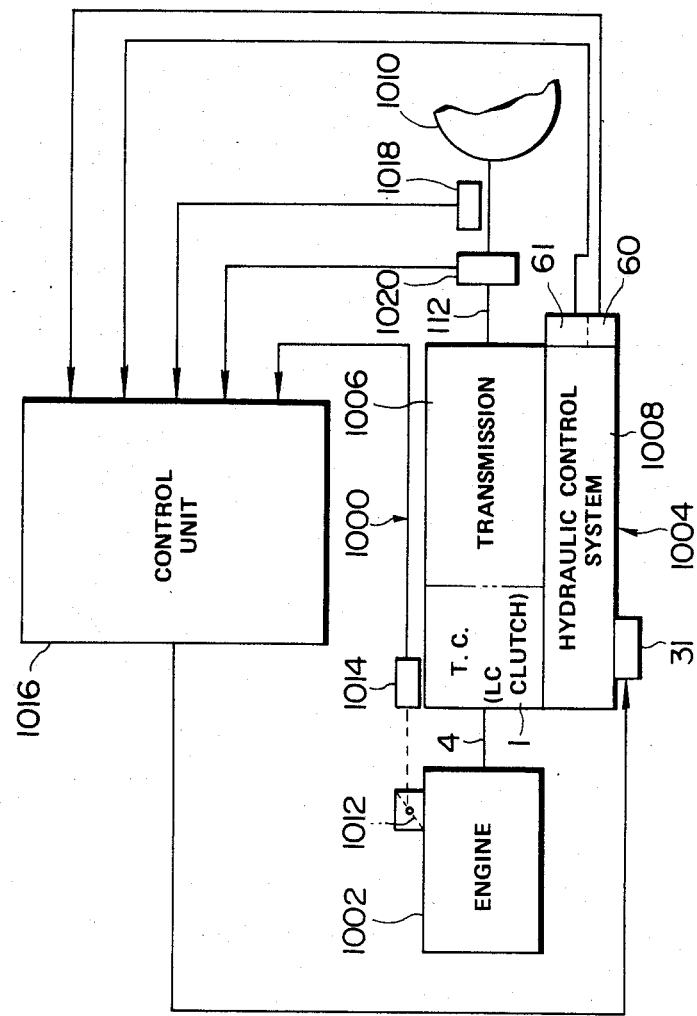
FIG. 1 is a block diagram of a motor vehicle drive train and an electrical control unit for implementing the lock-up control according to the present invention.

Reference numeral 1012 designates an engine throttle valve for controlling the power output of the engine 1002. A throttle sensor 1014 is responsive to the opening degree of the throttle valve 1012, and the output of the throttle sensor 1014, i.e., a throttle opening degree signal 205, is applied as an input to a control unit 1016.

A vehicle speed sensor 1018 is responsive to a rotational speed of a transmission output shaft 112, and the output, i.e., a vehicle speed signal 206, of the vehicle speed sensor 1018 indicative of the vehicle speed is applied as an input to the control unit 1016. Shift switches 60 and 61 (see FIG. 6 also) are responsive to the occurrence of a 1-2 shifting command and a 2-3 shifting command occurring in the hydraulic control system 1008 and the output of them is applied to the control unit 1016. A transmission output torque sensor 1018 is responsive to the torque on the transmission output shaft 112, and the output, i.e., a transmission output torque signal 209, of the torque sensor 1020 is applied as an input to the control unit 1016.

The control unit 1016 is operative in response to each of the above-mentioned inputs to provide a lock-up control signal 210 for actuation of a lock-up solenoid 31.

Figure 2:
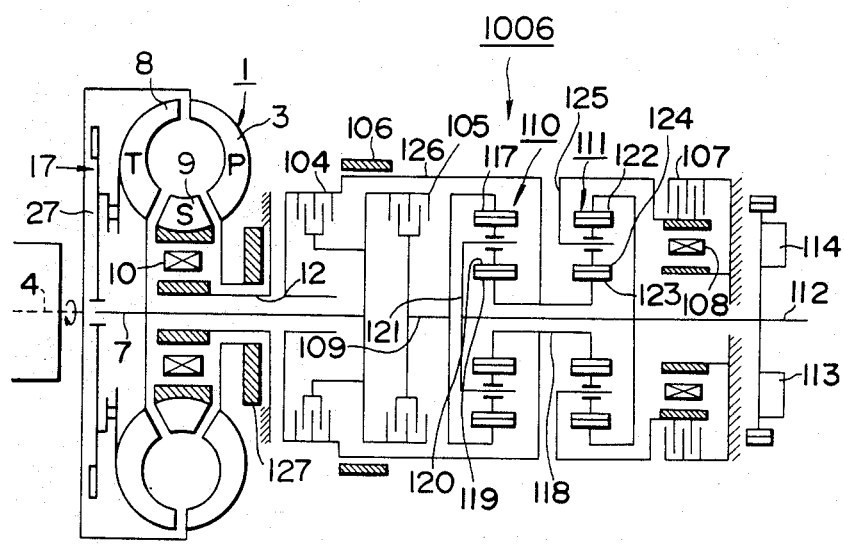
FIG. 2 is a schematic view of a mechanical part of the lock-up type automatic transmission.
Figure 3A:
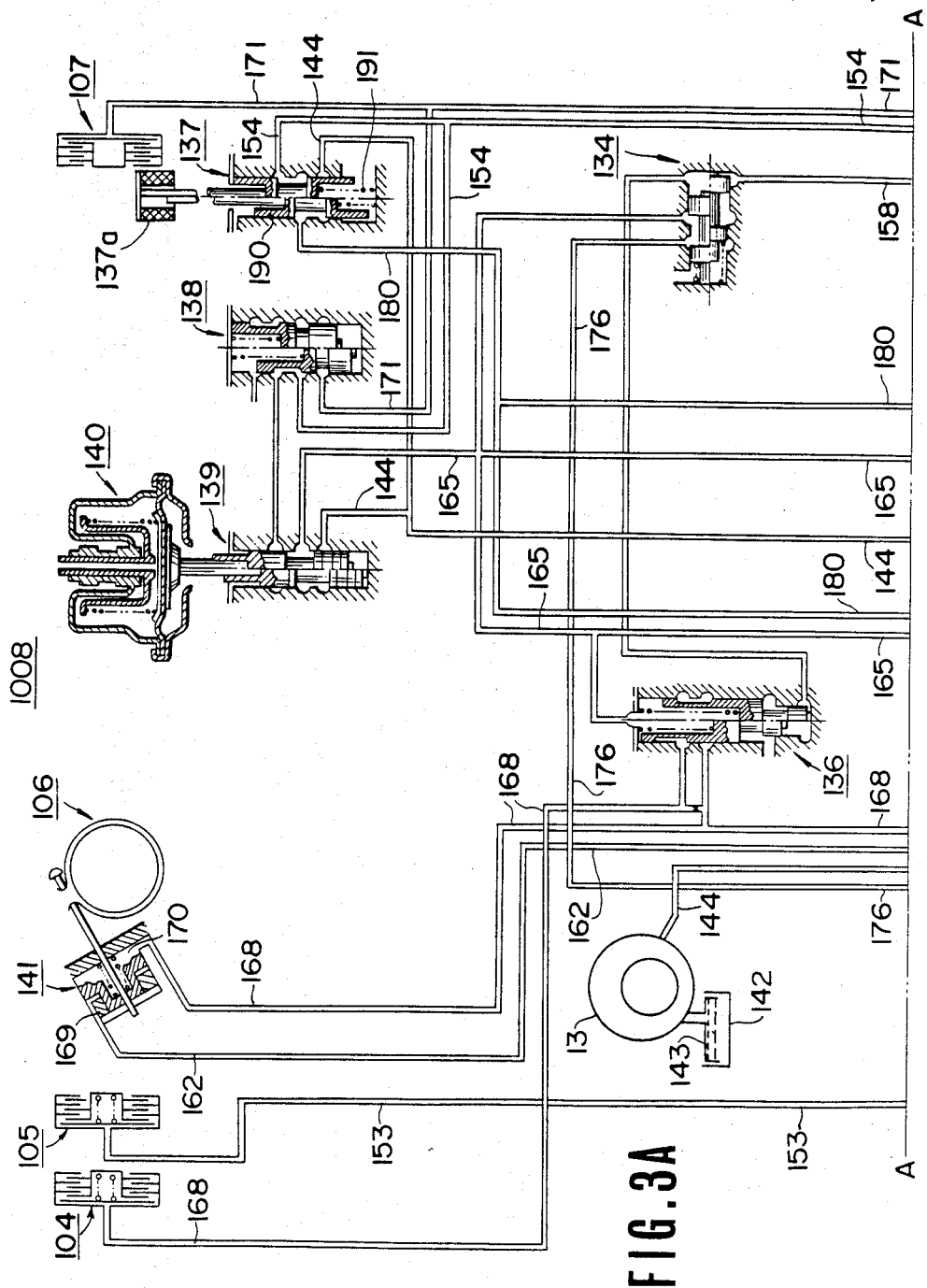
FIGS. 3A and 3B, when combined, provide a hydraulic control system of the lock-up type automatic transmission.
Figure 3B:
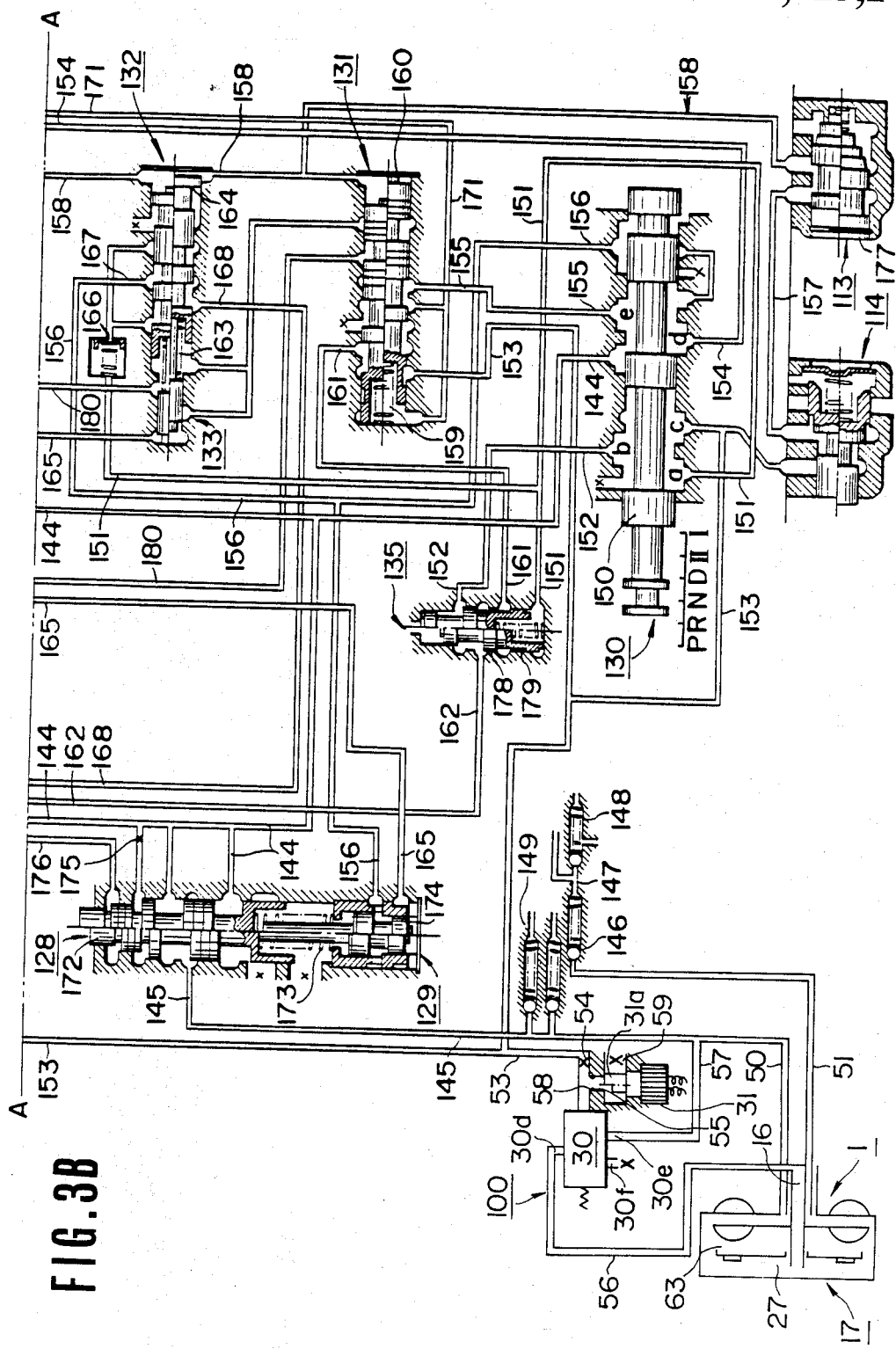
Figure 4A:
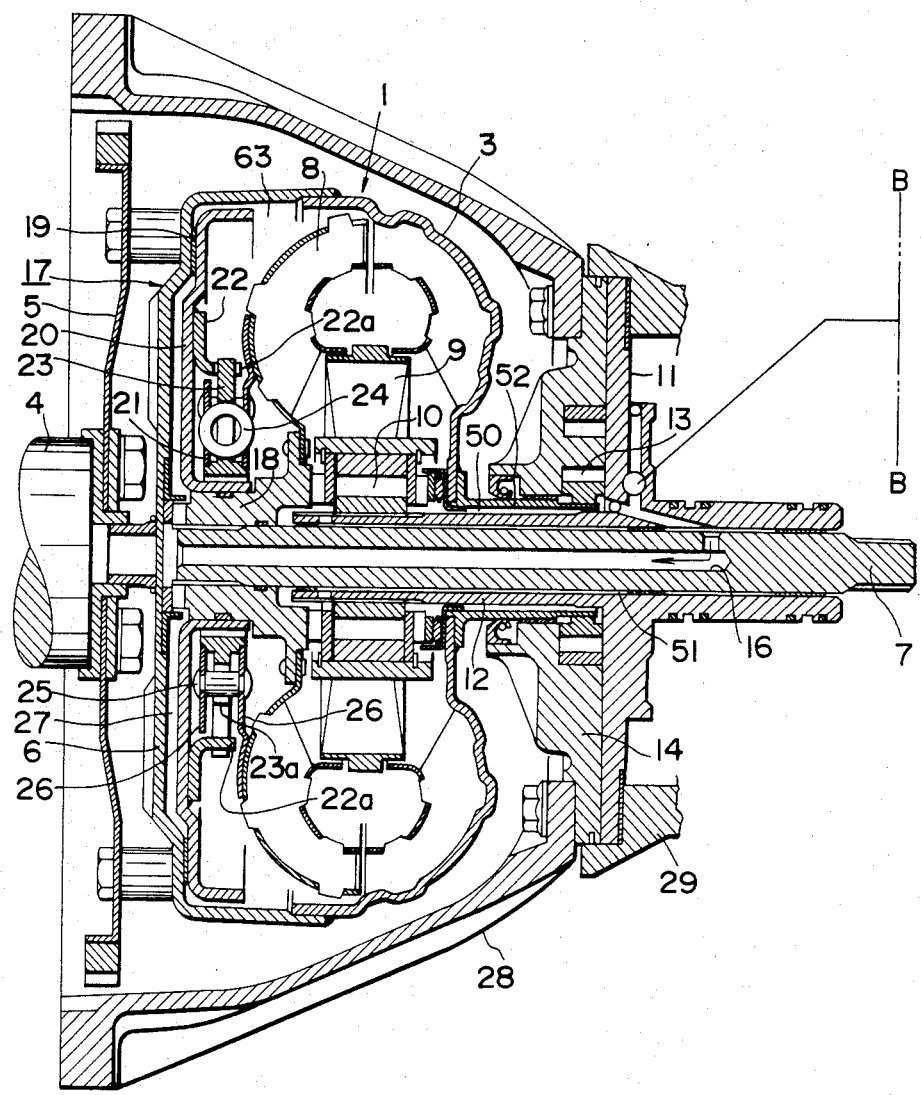
FIGS. 4A and 4B, when combined, provide a fragementary sectional view of a torque converter with a lock-up clutch in association with a lock-up control valve and an actuator in the form of a solenoid valve.
Figure 4B:
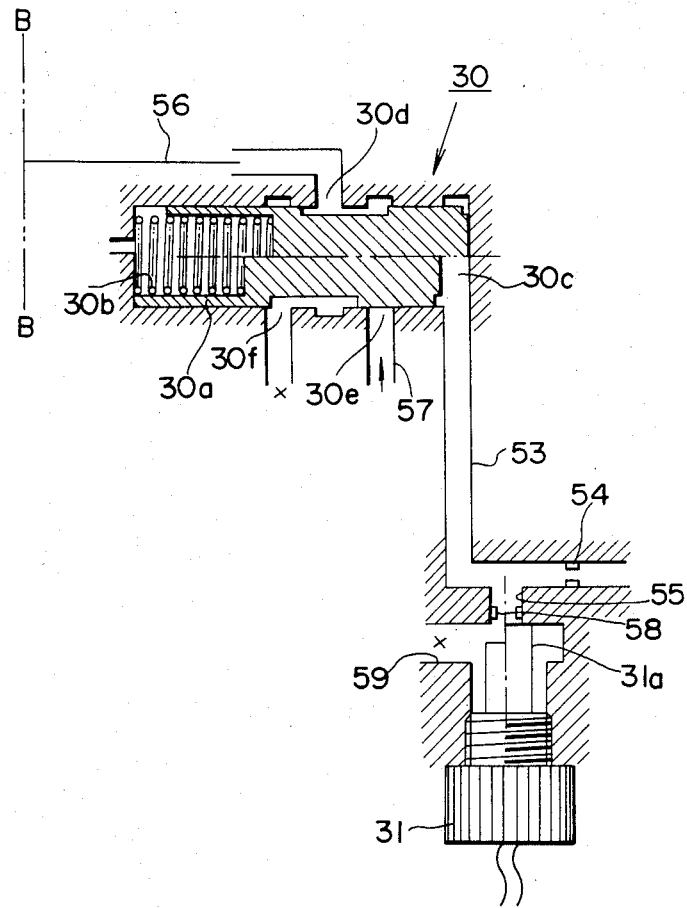

Referring to FIG. 2, the transmission 1006 and the torque converter 1 of the lock-up type automatic transmission 1004 are illustrated. Referring to FIGS. 3A and 3B, the hydraulic control system 1008 is illustrated. Referring to FIGS. 4A and 4B, the torque converter 1 associated with the lock-up solenoid 31 is illustrated. The detailed description of these Figures is found in a copending U.S. patent application Ser. No. 657,958, filed Oct. 5, 1984 which has been incorporated herein in its entirety and commonly assigned herewith. Particularly, reference is made to the description in this copending application regarding FIGS. 2, 3A, 3B, 4A, and 4B, therein. For completing the disclosure, reference is also made to U.S. Pat. No. 4,431,095 issued to Suga on Feb. 14, 1984 which has been incorporated herein.

Figure 5:
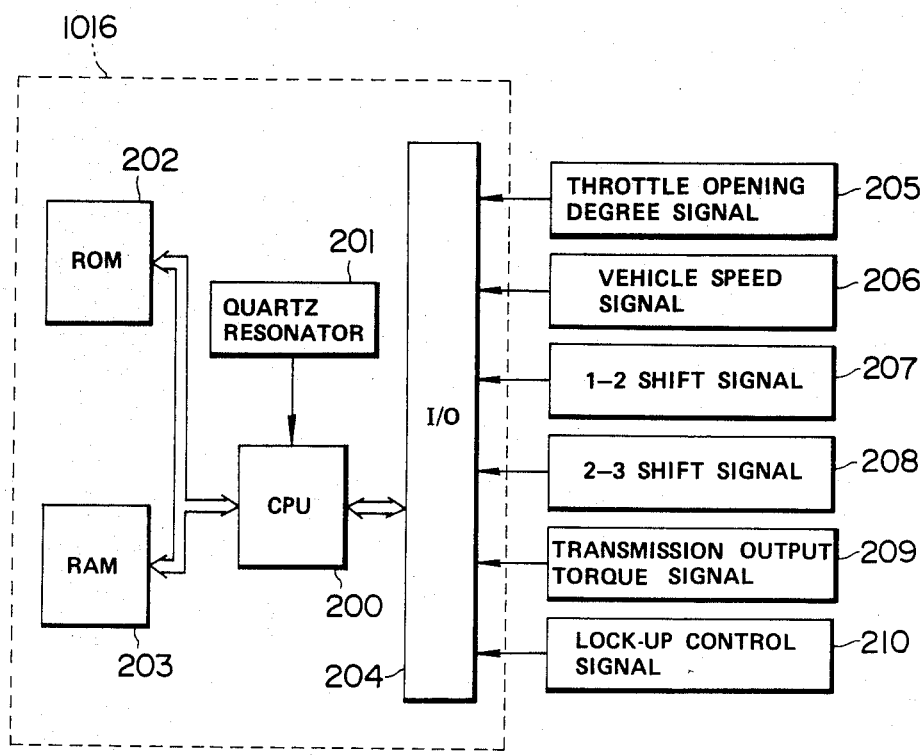
FIG. 5 is a block diagram showing the control unit including a microcomputer.

Referring to FIG. 5, the conrol unit 1016 is further described. Reference numeral 200 designates a central processor unit (CPU), 201 a quartz resonator, 202 a read only memory (ROM), 203 a random acess memory (RAM), and 204 an input output interface (I/O), which cooperate with each other to form a microcomputer. The CPU 200 is adapte to read in a throttle opening degree signal 205, a vehicle speed signal 206, a 1-2 shift signal 207, a 2-3 shift signal 208, and a transmission output torque signal 209 via the I/O 204, and then outputs a result of arithmetic operation using these input signals to the lock-up solenoid 31 in terms of lock-up control signal 210, whereby the lock-up solenoid 31 is selectively switched ON or OFF so as to control the lock-up action of the torque converter 1.

Figure 6:
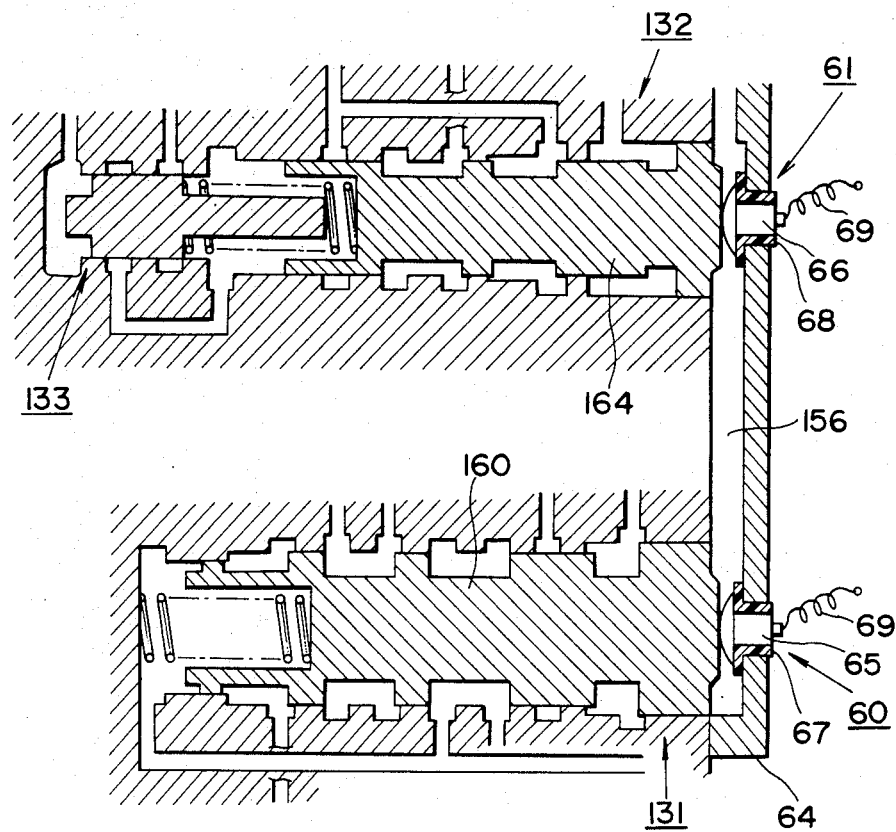
FIG. 6 is a schematic sectional view of the 1–2 shift and 2–3 shift valves illustrated in FIG. 3B showing shift switches used to generate a 1–2 shift signal and a 2–3 shift signal which are the inputs to the control unit shown in FIG. 5.

The 1-2 shift and 2-3 shift signal are given by the 1-2 shift switch 60 and 2-3 shift switch 61 which are built in the 1-2 shift valve 131 and 2-3 shift valve 132, respectively, as shown in FIG. 6. These switches 60, 61 are switched ON or OFF in response to positions of valve spools 160, 164, respectively, and generate the signals 207, 208. In order to accomplish this purpose, stationary contacts 65, 66 are mounted via insulators 67, 68 to a side plate 64 in such a manner that they are disposed in face-to-face relationship with ends of the valve spools 160, 164, respectively, whereas the valve spools 160, 164 are used to serve as movable contacts. The shift valves 131, 132 are grounded to a vehicle body so that the stationary contact 65 and the valve spool 160 cooperate with each other to form the 1-2 shift switch and the starionary contact 66 and the valve spool 164 cooperate with each other to form the 2-3 shift switch 61 only by connecting via resistor the starionary contacts 65, 66 to a source of electricity +V.

Considering the previous description, it will now be noted that the 1-2 shift switch 30 and 2-3 shift switch 61 generate low (L) level signals (207, 208), respectively, when the first speed is established because the valve spools 160, 164 assume the positions as illustrated in FIG. 6 where they contact with the corresponding starionary contacts 65. 66. When the second speed is established, the valve spool 160 alone assumes a position after having moved leftward as viewed in FIG. 6 disengaging from the stationary contact 65, and as a result the 1-2 shift switch 60 generates a high (H) level signal 207. When the third speed is established, the other valve spool 164 assumes a position after having moved leftward as viewed in FIG. 6 disengaging from the stationary contact 66 and as a result the 2-3 shift switch 61 generates a H level signal 208 also.

The transmission output torque signal 209 is generated by a well known torque sensor as disclosed in Published Japanese patent application No. 53-12447. With this sensor, the torque of the transmission output shaft 112 is measured by piezo-electric effect. With well known sensors, the throttle opening degree signal 205 and the vehicle speed signal 206 can be obtained also.

The CPU 200 receives a cock signal from the quartz resonator 201 and executes a program stored in the ROM 202 once after elapse of a predetermined time, for example 100 ms, and temporarily store necessary data in the RAM 203 or reads out the data therefrom during execution of the program.

Figure 7:
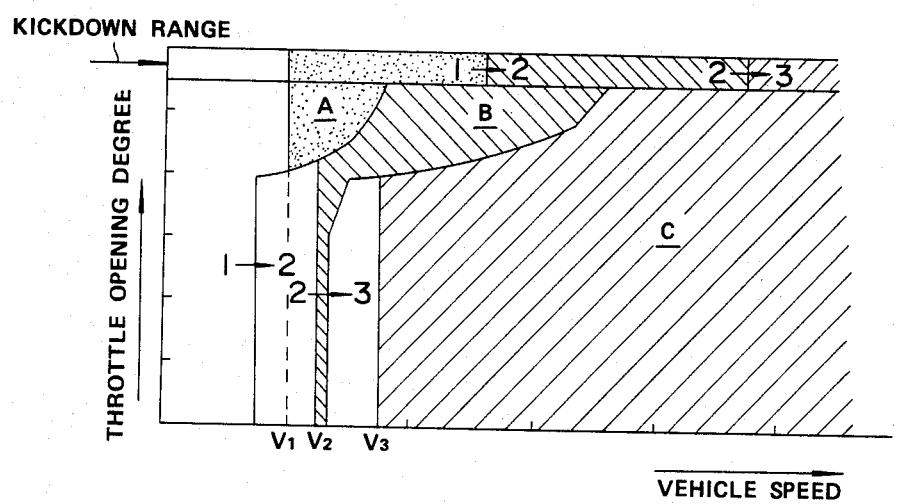
FIG. 7 is a shift pattern diagram showing lock-up ranges previously discussed.

In executing a control program not shown, the CPU 200 performs a determination based on a table as illustrated in a graph in FIG. 7 as to whether a vehicle travelling condition as represented by a throttle opening degree and a vehicle speed which are obtained from the signals 205, 206 and a gear position obtained from various combinations of levels of signals 206, 207 falls in any one of the lock-up ranges A, B and C where the torque converter 1 is to lock up or falls outside of these ranges, and then causes the lock-up control signal 210 to assume an H level when it falls in any one of the lock-up ranges so as to put the torque converter 1 into the lock-up state in terms of energizing the lock-up solenoid 31, or causes the lock-up control signal 210 to take the L level when it falls outside of the lock-up ranges so as to render the torque converter 1 in the torque converter state in terms of deenergizing the lock-up solenoid 31.

The description of the above paragraph relates to the basic lock-up control strategy as represented by the graph shown in FIG. 7. More particularly, the CPU 200 executes a control program as shown in FIGS. 8A and 8B in shifting from one to another speed during running in one of the lock-up ranges so as to interrupt the lock-up action.

Figure 8A:
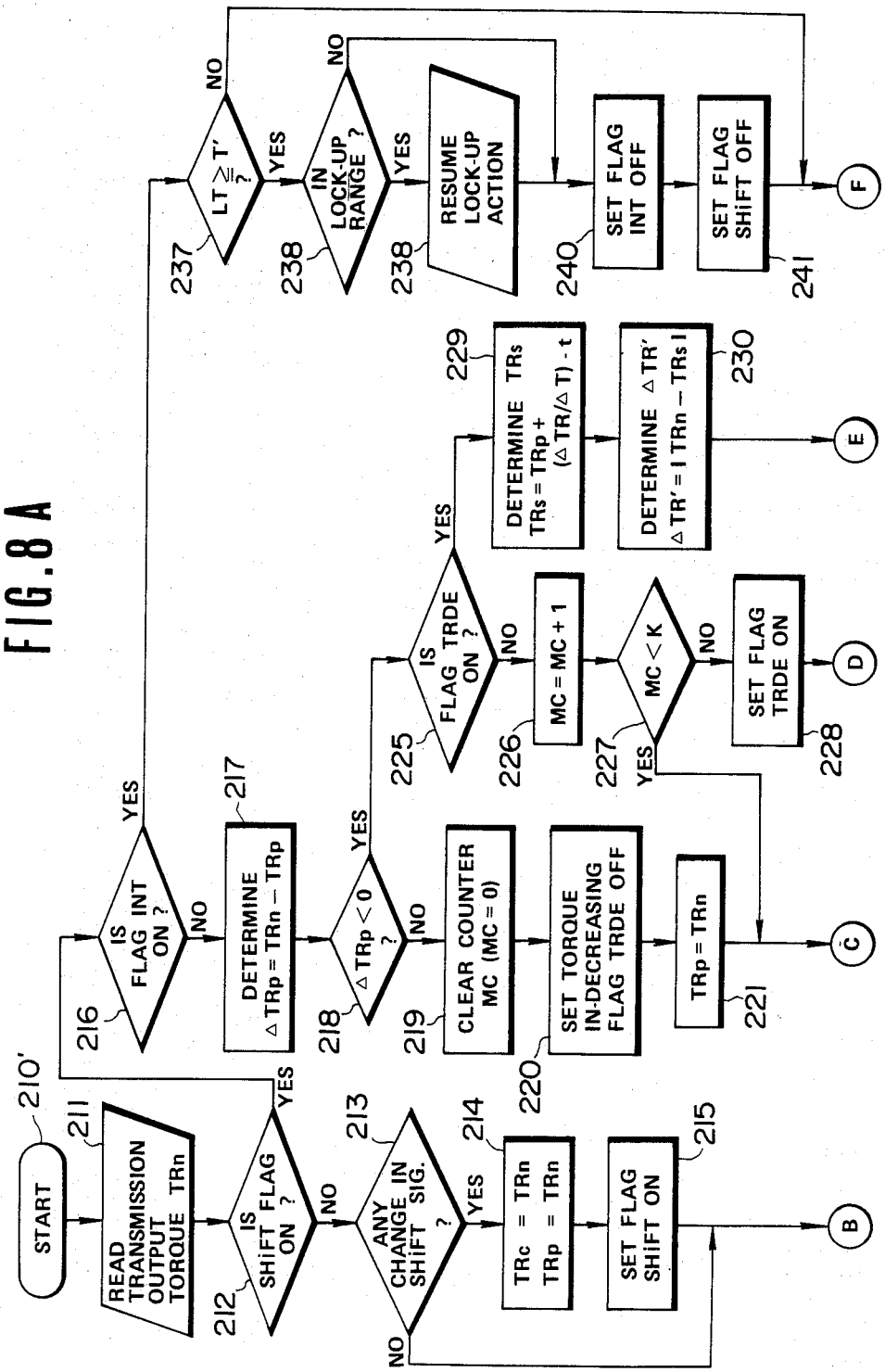
FIGS. 8A and 8B, when combined, are a flowchart showing a control program stored in the microcomputer shown in FIG. 5.
Figure 8B:
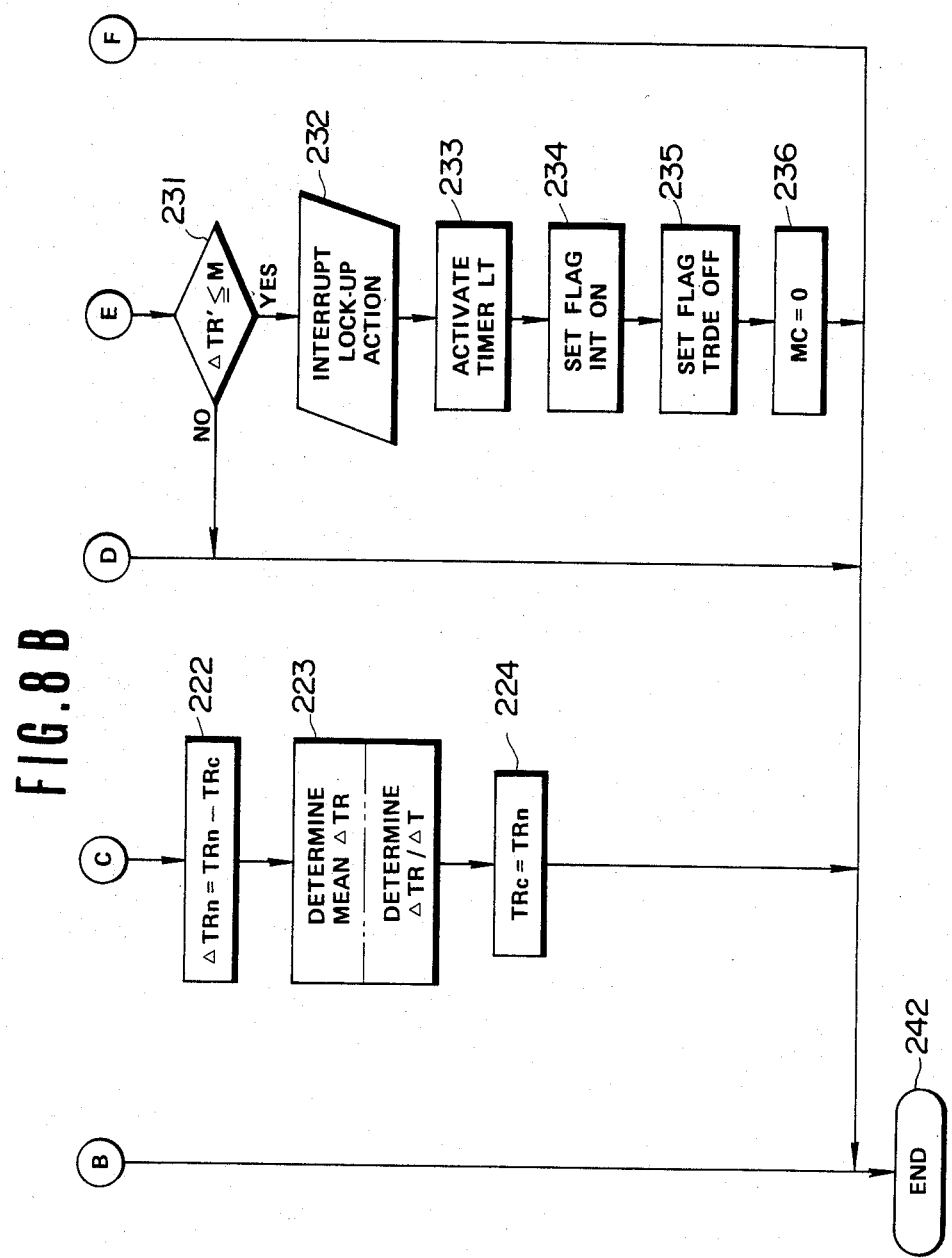

The execution of the control program shown in FIGS. 8A and 8B is caused from a step 210' by the interruption occurring after lapse of a predetermined period of time (operation cycle) ΔT. First of all, the transmission output torque TRn (i.e., the transmission output torque signal 209) is read in a step 211, and then the next step 212 is executed where decision is made whether or not a shift flag SHiFT is ON so as to determine whether or not the shifting operation progresses.

When the shift flat SHiFT is OFF (step 212), indicating the state where the gear shifting operation is not carried out, the CPU 200 is caused to select a step 213 where decision is made whether or not the 1-2 shift signal 207 or 2-3 shift signal 208 has changed its level in order to determine whether or not there is a command for shifting. When there is no shifting command, the execution of the program ends at a step 242. When there is a command for shifting (the instant t1 as viewed in FIG. 10C), the CPU 200 is caused to select a step 214, after the step 213, where it stores the output torque TRn obtained in the step 211, as a previous value, at a previous value address TRc, and, as a peak value, at a peak value address TRp. The value stored at the address TRc is subsequently used to detect the trend in the variation of the output torque appearing after the occurrence of the shifting command, while the value stored at the address TRp is used to detect the peak which the output torque reaches before the actual shifting operation begins. Thereafter, the CPU 200 is caused to select a step 15 where the shift flag SHiFT is set ON before the execution of the control program ends at the step 242.

Figure 10A:
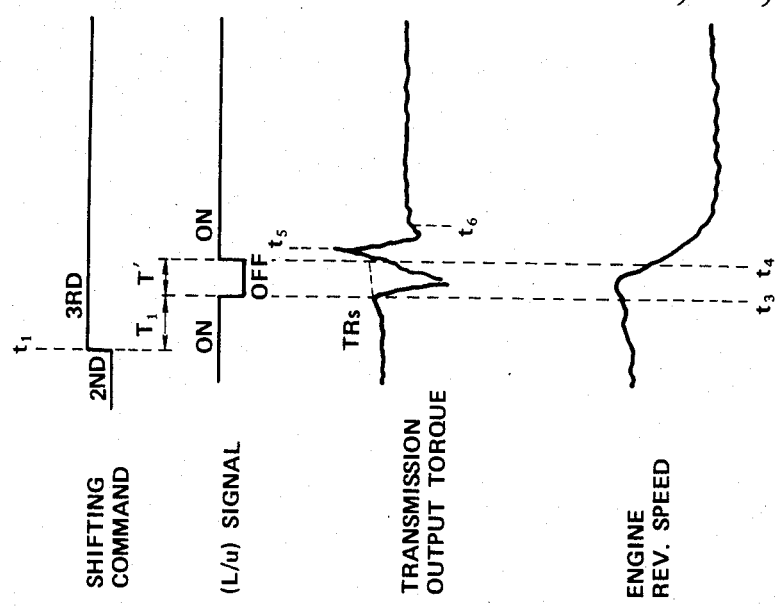
FIG. 10A and 10B are timing diagrams used to explain the conventional lock-up control previously discussed.
Figure 10B:
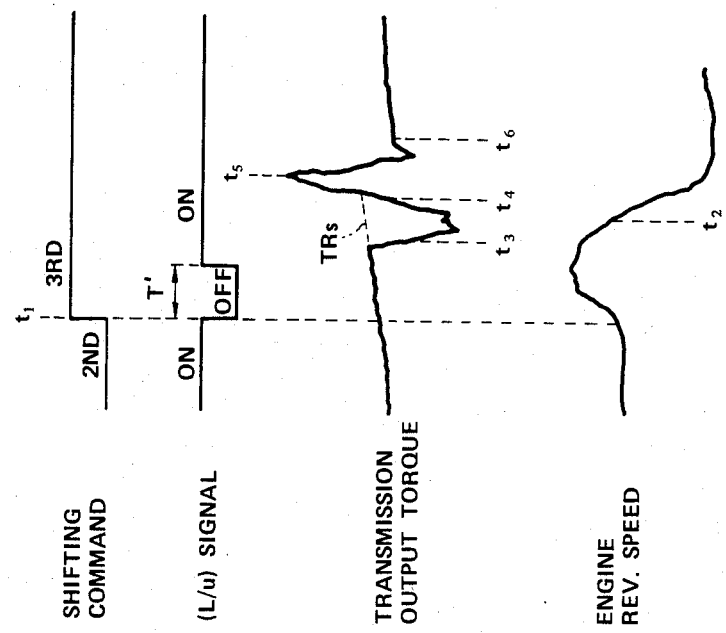
Figure 10:
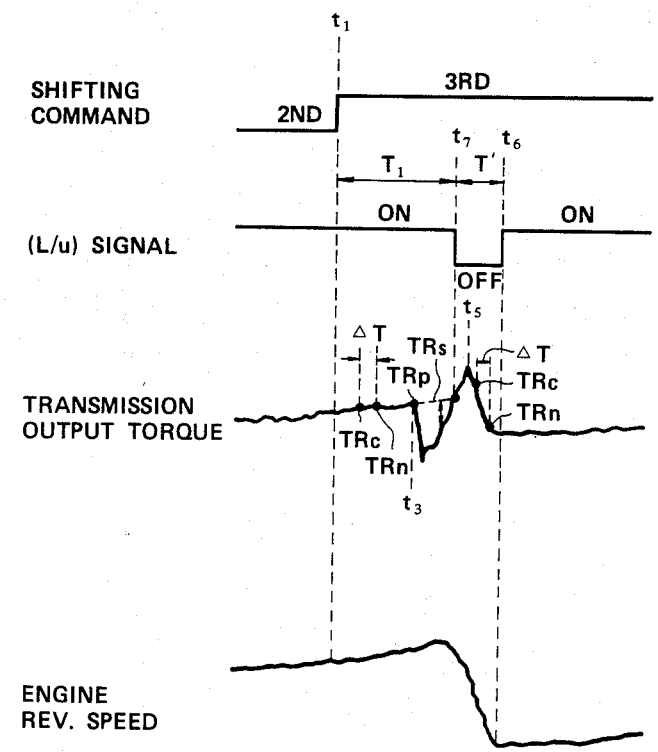
FIG. 10C is a similar timing diagram for the present invention. DESCRIPTION OF THE EMBODIMENTS Referring now more particularly to FIG. 1, reference numeral 1000 designates a motor vehicle drive train comprising an engine 1002 and a lock-up type automatic transmission 1004. The lock-up type automatic transmission 1004 includes a transmission in the form of a change speed gearing 1006, a torque converter 1 and a hydraulic control system 1008. The torque converter 1 includes a lock-up clutch 17 (see FIG. 2). The engine crankshaft 4 drives the transmissiom 1006 through the torque converter 1, and the transmission 1006 is connected to road wheel 1010 in a conventional manner.

In the execution of the control program after the shift flag SHiFT has been set ON (after the instant t1 as shown in FIG. 10C), the CPU 200 is caused to select a step 216, after the step 212, where it decides whether or not the lock-up action is interrupted. This decision is made after reviewing whether the lock-up interruption flag INT is ON or OFF. This flag INT is set ON when the lock-up interruption begins. When the flag INT is OFF and thus the answer to the inquiry of the step 216 is NO, the CPU 200 is caused to select a step 217 where a difference ΔTRp between the value at the address TRn and the value at the address TRp is given by calculating the equation TRn−TRp.

In the next step 218, a decision is made whether or not the difference ΔTRp is negative so as to determine whether or not the transmission output torque is decreasing. When the answer to the inquiry ΔTRp<0 is NO, indicating that the transmission output torque is unchanged or increasing, the CPU 200 is caused to select a step 219 where a counter MC is cleared and set to zero (0). As will be described later, the counter MC counts how many times the decision in the step 218 has determined ΔTRp<0 (the torque is decreasing). Then, a step 220 is executed where a torque in-decreasing indicative flag TRDE is set OFF. This flag TRDE is ON when he transmission output torque begins to decrease. Then, in the next step 221 the torque TRn read in the step 211 is set, as the peak value, at the address TRp. Thereafter, the value stored during this execution at the peak value address TRp is used in the step 217 during the subsequent execution of the control program.

In the next step 222, a difference ΔTRn between the output torque TRn and the value stored at the address TRc is determined by calculating the equation TRn−TRc. This difference ΔTRn indicates the variation (increase) in the transmission output torque during a short period of time between the instant t1 when the shifting command appears and the instant t3 when the actual shifting operation begins. In the next step 223, the mean ΔTR is determined from the value obtained in the step 222 during the present execution and the value obtained in the same step 222 during the previous execution, and then the time derivative of the output torque ΔTR/ΔT is given by dividing the mean ΔTR by the operation cycle ΔT. Owing to these jobs in the step 223, even if the output torque signal 209 contains noise momentarily, the time derivative of the transmission output torque (i.e., the trend in the variation of the output torque) during the time period from the instant t1 to the instant t3 is given with good accuracy. Subsequently, the CPU 200 is caused to execute a step 224 where the output torque TRn obtained in the step 211 during the present execution is stored at the previous value address TRc before the execution of the control program ends at the step 242.

In the subsequent execution of the control program where the answer to the inquiry ΔTRp<0 (step 218) is YES, indicating the state where the transmission output torque starts to decrease, the CPU 200 is caused to select a step 225 where a decision is made whether or not the in-deceleration flag TRDE is ON. Since, in the step 220, this flag TRDE has been set OFF, the CPU 200 is caused to select the step 226, after the step 225, where the counter MC is counted up by one step. In the next step 227, decision is made whether or not the counter MC is less than a predetermined value K (for example, 3). When the countent of the counter MC is larger than the predetermined value K, the in-decreasing indicative flag TRDE is set ON in the step 218, and then the execution of the control program ends at the step 242. However, when the content of the counter MC is less than K, the CPU 200 is caused to select the steps 222, 223 and 224 in this order. After the execution of these steps, the execution is repeated until the content of the counter MC becomes equal to the predetermined value K. The reason why the two steps 226 and 227 are provided between the decision step 225 and the step 228 is to confirm securely that the torque has begun to decrease at or beyond the instant t3 (see FIG. 10C).

In the execution of the control program immediately after the step 228 has been executed, the CPU 200 is caused to select the step 229 after the step 225. In the step 229, an estimated output torque TRs indicative of the transmission output torque which would be produced after the instance t3, as viewed in FIG. 10C, is determined by calculating the equation TRs=TRp+(ΔTR/ΔT)·t, where t=lapse time after the instant t3. In the next step 230, the absolute value ΔTR' of the difference between the TRs and TRn is determined by calculating the equation ΔTR'=|TRn−TRs|, and then decision is made in the next step 231 whether or not this difference ΔTR' is less than or equal to a predetermined value M. This predetermined value M is used for recognizing the instant t7 as viewed in FIG. 10C when the actual value TRn agrees with the estimated value TRs. So, theoretically, the predetermined value M should be 0 (zero). Actually, taking into account small deviations in an torque detecting time and an arithmetic operation error, the predetermined value M should be set to a small value near zero.

When the answer to the inquiry ΔTR'≦M (step 231) is NO, the CPU 200 is caused to select the step 242. However, when the answer to the inquiry ΔTR'≦M is YES, the CPU 200 is caused to select the step 232 where the lock-up action is interrupted. In the step 232, the lock-up interruption command is issued to set the lock-up control signal 210 to the L-level. When the signal 210 is set to the L-level, the lock-up solenoid 31 is deenergized so as to interrupt the lock-up action, so the torque converter 1 is shifted to the converter state even if it is operating in the lock-up range.

Thereafter, a step 233 is executed to activate a lock-up interruption timer LT which is used to count a lock-up interruption period of time (i.e., the lapse time from the instant t7 as viewed in FIG. 10C), and then a lock-up interruption flag INT is set ON in a step 234. The lock-up interrtuption flag INT indicates that the lock-up action is interrupted. In the next step 235, the in-decreasing flag TRDE is set OFF, and the counter MC is cleared in a step 236 before the execution of the control program ends at the step 242.

In the execution of the control program after the lock-up interruption flag INT has been set ON, the CPU 200 is caused to select a step 237 after the step 216. In the step 237, decision is made whether or not the content of the lock-up interruption timer LT activated in the step 233 is greater than a prestored lock-up interruption period of time T' (see FIG. 10C). In other words, what is done in this step 237 is to decide whether or not the predetermined period of time T' has lapsed from the instant t7 so as to recognize the instant t6 when the lock-up interruption is to be released. Before reaching the instant t6, the CPU 200 is caused to select the step 242 and the lock-up interruption continues, whereas when after reaching the instant t6, the CPU 200 is caused to select a step 238 where decision is made based on the basic lock-up control strategy using the table data corresponding to the schedule diagram shown in FIG. 7 whether or not the torque converter 1 should operate in the lock-up ranges A, B or C. When the torque converter 1 is to operate within any one of these lock-up ranges, the CPU 200 is caused to select a step 239 where a lock-up resumption command is issued which causes the lock-up control signal 210 to be set to the H-level. When the lock-up control signal 210 is set to the H-level, the lock-up solenoid 31 is energized, thus causing the torque converter 1 to lock up. When the operating state changes from the lock-up range to the torque converter range during the interruption of the lock-up action, the step 239 is bypassed, thus keeping the torque converter 1 to assume the torque converter state.

After executing the step 238 or 239, the CPU 200 is caused to select a step 240 where the lock-up interruption flag INT is set OFF, and then the above mentioned shift flag SHiFT is set OFF also in the next step 241 before the execution of the control program ends at the step 242.

Referring to FIG. 10C, according to the above discussed control, the interruption of the lock-up action is initiated at the instant t7 when the transmission output torque substantially agrees with the estimated value TRs and it continues for the predetermined period of time T', so that even if the instant t3 varies with the dispersion of the manufacturing products, the lock-up interruption instant t7 is always determined regardless of the variation in the instant t3. Since the lock-up action is interrupted with good timing, the engine racing is prevented as demonstrated in FIG. 10C, thus alleviating the occurrence of substantial shocks upon gear shifting which would be caused by the engine racing. Furthermore, the torque peak appearing at the instant t5 is lowered because the lock-up action is interrupted to cause the torque converter 1 to always absorb this torque peak, thus alleviating the shocks caused by this torque peak. Furthermore, since there is no delay in the initiation of the interruption of lock-up action, the increase in the magnitude of the torque peak (at the instant t5) due to the delay is prevented.

Since, in this embodiment, the lock-up interruption period of time T' is constant, the lock-up interruption release instant t6 may not always agree with the completion of the actual shifting operation which may vary with the dispersion of the manufacturing products. If the lock-up interruption period of time T' is not long enough, there occurs an early resumption of the lock-up action, resulting in insufficient reduction upon shifting. If it is too long, a delayed resumption of the lock-up action is caused, resulting in deterioration of the fuel economy.

Figure 9:
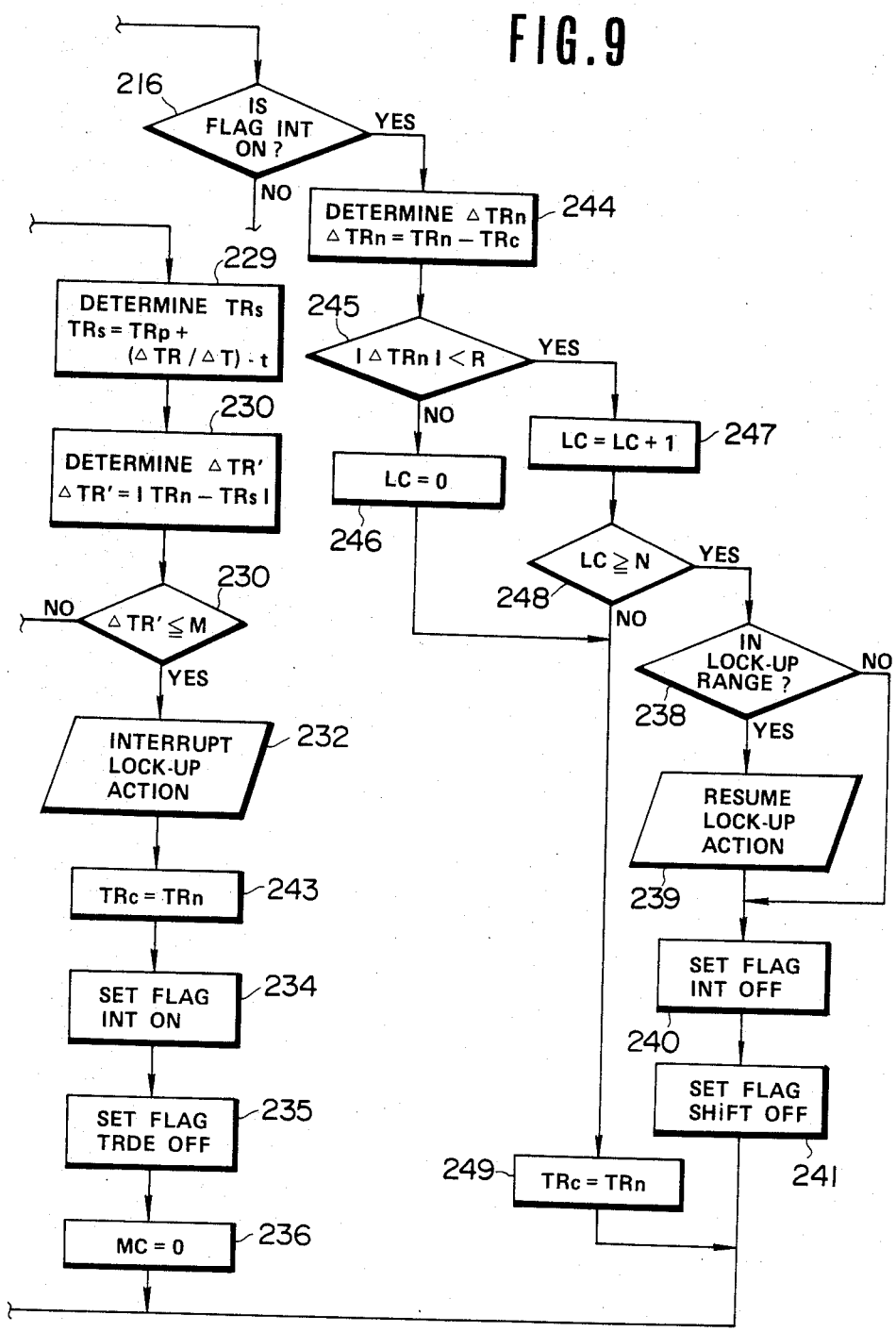
FIG. 9 is fragmentary view of a flowchart of a modified control program.

Referring to FIG. 9, a control program used in a second embodiment is described which is different from that shown in FIGS. 8A and 8B in that the control loop for resumption of the lock-up action of the control program as shown in FIGS. 8A and 8B has been modified so as to solve the above mentioned problem. Actually, in this embodiment, the step 233 has been replaced with a step 243 and the step 237 has been replaced with a series of steps 244 to 249.

In the step 243, the output torque TRn obtained in the step 211 (ref. FIG. 8A) is stored at the previous vaue address TRc. In the step 244, the difference $\Delta TRn$ between the present value TRn and the previous value TRc is determined by calculating the equation $\Delta TRn = TRn - TRc$, and in the next step 245 decision is made whether or not the absolute value $|\Delta TRn|$ is less than a predetermined value R ($|\Delta TRn|$ may be regarded as a time derivative because it represents the variation taking place during the operation cycle $\Delta T$). The setting is such that the predetermined value R should be the first time derivative of the output torque at the instant t6 when the output torque reaches a stable level (see FIG. 10C).

When the answer to the inquiry $|\Delta TRn| < R$ (step 245) is NO, the CPU 200 is caused to select a step 246 where a lock-up counter LC is cleared and set to zero. In the next step 249, the output torque TRn is set to the previous value address TRc before the execution of the control program ends at the step 242 (see FIG. 8B).

When the answer to the inquiry $|\Delta TRn| < R$ (step 240) is YES, indicating that the output torque has reached the stable level (the instant t6), the CPU 200 is caused to select the step 247 where the counter LC is increased by one. In the next step 248, decision is made whether or not the content of the counter LC is greater than or equal to a predetermined value N (for example, 3). When it is less than the predetermined value N, indicating that the output torque has not reached the stable level yet, the CPU 200 is caused to select the step 249, whereas when it is greater than the predetermined value N, indicating that the output torque has reached the stable level (the instant t6), the steps 238 to 241 are executed to release the interruption of the lock-up action.

According to this second embodiment, the instant t6 when the transmission output torque reaches the stable level is recognized, and the basic control of lock-up action is resumed at this instant t6. Therefore, the resumption of the basic control lock-up action can be adjusted to the instant when the actual shifting operation is completed regardless of the variation due to the dispersion of the manufacturing products.

What is claimed is:

1. A lock-up control system for a lock-up type automatic transmission including a torque converter with a lock-up clutch, comprising:
   means for detecting the occurrence of a command for shifting the transmission and generating a shifting command signal;
   means for detecting output torque of the transmission and generating a transmission output torque signal indicative of the output torque of the transmission; and
   means for determining and storing signals indicative of variations in said output torque signal and interrupting the lock-up action of the torque converter based on said transmission output torque signal by releasing the engagement of the lock-up clutch after said transmission output torque signal has demonstrated a predetermined trend in said variations after generation of said shifting command signal.

2. A lock-up control system as claimed in claim 1, wherein said lock-up action interrupting means comprises:
   means for determining a time derivative of said transmission output torque signal after generation of said shifting command signal and estimating a trend in the transmission output torque;
   means for generating a command signal for interrupting the lock-up action of the torque converter after said transmission output torque signal has satisfied a predetermined relationship with said estimated trend; and
   means for generating a command signal for releasing the interruption of the lock-up action after a second predetermined condition has been satisfied after generation of said command signal for interrupting the lock-up action of the torque converter.

3. A lock-up control system as claimed in claim 2, wherein said second predetermined condition involves the lapse of a predetermined period of time after generation of said command signal for interrupting the lock-up action of the torque converter.

4. A lock-up control system as claimed in claim 2, wherein said second predetermined condition involves a condition where the time derivative of said transmission output torque signal has fallen into a predetermined range.

5. A lock-up control method for a lock-up type automatic transmission including a torque converter with a lock-up clutch, comprising:
   detecting the occurrence of a command for shifting the transmission and generating a shifting command signal;
   detecting output torque of the transmission and generating a transmission output torque signal indicative of the output torque of the transmission;
   determining and storing signals indicative of variations in said output torque signal; and
   interrupting the lock-up action of the torque converter by releasing the engagement of the lock-up clutch after said transmission output torque signal has demonstrated a predetermined trend in said variations after generation of said shifting command signal.

6. A lock-up control method as claimed in claim 5, wherein said lock-up action interrupting step comprises:
   determining a time derivative of said transmission output torque signal after generation of said shifting command signal and estimating a trend in the transmission output torque;
   generating a command signal for interrupting the lock-up action of the torque converter after said transmission output torque signal has satisfied a predetermined relationship with said estimated trend; and
   generating a command signal for releasing the interruption of the lock-up action after a second predetermined condition has been satisfied after generation of said command signal for interrupting the lock-up action of the torque converter.

* * * * *